(12) United States Patent
Zheng et al.

(10) Patent No.: US 11,890,799 B2
(45) Date of Patent: Feb. 6, 2024

(54) DIELECTRIC MATERIAL AND DIELECTRIC MATERIAL PRODUCTION METHOD

(71) Applicant: FOSHAN EAHISON COMMUNICATION CO., LTD., Guangdong (CN)

(72) Inventors: Hongzhen Zheng, Guangdong (CN); Yongchao Lu, Guangdong (CN); Wei Li, Guangdong (CN); Chunhui Shang, Guangdong (CN); Yaozhi Sun, Guangdong (CN)

(73) Assignee: FOSHAN EAHISON COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/638,342

(22) PCT Filed: Nov. 11, 2019

(86) PCT No.: PCT/CN2019/116967
§ 371 (c)(1),
(2) Date: Feb. 25, 2022

(87) PCT Pub. No.: WO2021/051524
PCT Pub. Date: Mar. 25, 2021

(65) Prior Publication Data
US 2022/0297364 A1    Sep. 22, 2022

(30) Foreign Application Priority Data

Sep. 18, 2019   (CN) .......................... 201910867980.8

(51) Int. Cl.
*B29C 48/09*   (2019.01)
*H01Q 21/20*   (2006.01)
(Continued)

(52) U.S. Cl.
CPC .......... *B29C 48/09* (2019.02); *B29C 48/0012* (2019.02); *B29C 48/022* (2019.02);
(Continued)

(58) Field of Classification Search
None
See application file for complete search history.

(56) References Cited

U.S. PATENT DOCUMENTS

| | | |
|---|---|---|
| 4,288,337 A | 9/1981 | Ota et al. |
| 4,806,932 A | 2/1989 | Bechtel |

(Continued)

FOREIGN PATENT DOCUMENTS

| | | |
|---|---|---|
| CN | 103474147 A | 12/2013 |
| CN | 105470659 A | 4/2016 |

(Continued)

OTHER PUBLICATIONS

Machine Translation Liu (CN 109623894) (Year: 2018).*
(Continued)

*Primary Examiner* — Robert J Grun
(74) *Attorney, Agent, or Firm* — Norton Rose Fulbright US LLP; James R. Crawford (57) ABSTRACT

Provided is a dielectric material (1, 2, 3, 4) to solve the problems of low production efficiency and high production cost of the existing dielectric material. The dielectric material (1, 2, 3, 4) is a tube structure. The tube wall of the tube structure is formed from a foam material foamed. The dielectric material further includes metal wires (11, 21, 31, 41). The metal wires (11, 21, 31, 41) are disposed in the longitudinal direction of the tube structure, and are evenly distributed in the tube wall of the tube structure without being in contact with each other. The dielectric material (1, 2, 3, 4) with such a structure has the advantages of simple structure, accurate control of the dielectric constant, light (Continued)

weight per unit volume, easy and efficient production, and stable technical indicators. Further provided is a dielectric material production method.

6 Claims, 6 Drawing Sheets

(51) Int. Cl.
*H01Q 15/08* (2006.01)
*B29C 48/00* (2019.01)
*B29C 48/15* (2019.01)
*B29L 11/00* (2006.01)

(52) U.S. Cl.
CPC ............ *B29C 48/15* (2019.02); *H01Q 15/08* (2013.01); *H01Q 21/205* (2013.01); *B29K 2023/06* (2013.01); *B29K 2995/0006* (2013.01); *B29K 2995/0094* (2013.01); *B29L 2011/0016* (2013.01)

(56) References Cited

U.S. PATENT DOCUMENTS

| | | |
|---|---|---|
| 2008/0088512 A1 | 4/2008 | Su et al. |
| 2011/0003131 A1 | 1/2011 | Matitsine |

FOREIGN PATENT DOCUMENTS

| | | | | |
|---|---|---|---|---|
| CN | 105470660 A | | 4/2016 | |
| CN | 105489420 A | | 4/2016 | |
| CN | 107959122 A | | 4/2018 | |
| CN | 109623894 A | * | 4/2019 | ............ B26D 1/08 |
| CN | 110098490 A | | 8/2019 | |
| DE | 69508105 T2 | | 11/1999 | |
| EP | 0792206 B1 | * | 8/1995 | ............ B29C 47/02 |
| JP | H03109802 A | | 5/1991 | |
| WO | 2005002841 A1 | | 1/2005 | |
| WO | 2006028272 A1 | | 3/2006 | |
| WO | WO-2008137393 A1 | * | 11/2008 | .......... B29C 44/322 |
| WO | 2009078807 A1 | | 6/2009 | |
| WO | 2019055134 A1 | | 3/2019 | |
| WO | 2020218927 A1 | | 10/2020 | |
| WO | 2021047006 A1 | | 3/2021 | |

OTHER PUBLICATIONS

Machine Translation DeBruille et al. (EP0792206) (Year: 1995).*
Office Action No. 1 issued by the CIPO in the corresponding Patent Application No. 201910867980.8, with English translation.
Office Action No. 2 issued by the CIPO in the corresponding Patent Application No. 201910867980.8, with English translation.
Search Reports issued by the CIPO.
International Search Report issued in PCT/CN2019/116967 dated Jun. 16, 2020.
European Search Report dated Aug. 29, 2023 in corresponding patent application No. 19945734.2-1102.

* cited by examiner

DIELECTRIC MATERIAL AND DIELECTRIC MATERIAL PRODUCTION METHOD

CROSS-REFERENCE TO RELATED APPLICATIONS

The present application is a United States national phase under 35 U.S.C. § 371 of International Patent Application No. PCT/CN2019/116967, filed Nov. 11, 2019, which claims the benefit of priority from Chinese Patent Application No. 201910867980.8 filed Sep. 18, 2019, each of which is expressly incorporated herein by reference in its entirety.

TECHNICAL FIELD

The present disclosure relates to the field of dielectric material manufacturing and, in particular, to a dielectric material that can be used in the manufacturing of a Luneburg lens and a dielectric material production method.

BACKGROUND

A patent document entitled "AN ARTIFICIAL DIELECTRIC MATERIAL AND A METHOD OF MANUFACTURING THE SAME", with publication No. WO2009078807 and a publication date of Jun. 25, 2009, discloses an artificial dielectric material and a method for manufacturing the same. This artificial dielectric material can be used in the manufacturing of a Luneburg lens. The solution is mainly to dispose long conductive fibers in parallel arrangement between an upper sheet of foam material and a lower sheet of foam material, adhere them into a sandwich structure sheet and then cut the sheet into particles. The obtained particles include short conductive fibers that are not in contact with each other. These particles are randomly mixed and adhered together by an adhesive to obtain a dielectric material with a controlled dielectric constant.

However, the product and the manufacturing method described in the disclosure are defective in practice as follows: since the size of particles is very small, usually only a few millimeters square, the cutting method configured to cut the sandwich structure sheet into particles is basically a longitudinally and latitudinally cutting method. Therefore, the cutting workload in a later stage is large, and the requirement of cutting precision is high. As a result, the production cost is increased eventually.

Thus, the structure and the manufacturing method of the existing dielectric material need to be improved.

SUMMARY

The present disclosure provides a dielectric material to solve the problems of low production efficiency and high production cost of the existing dielectric material.

The dielectric material, in particular, is a tube structure. The tube wall of the tube structure is formed from a foam material foamed. The dielectric material further includes metal wires. The metal wires are disposed in the longitudinal direction of the tube structure, are evenly distributed in the tube wall of the tube structure without being in contact with each other.

The foam material is preferably expandable polyethylene (EPE) pearl cotton, an expandable polystyrene (EPS) material or an ethylene vinyl acetate (EVA) material.

The number of metal wires is preferably 2 to 8. The diameter of one metal wire segment is preferably in a range from 0.01 mm to 0.5 mm.

The contour shape of the outer periphery of the cross section of the tube structure may be a circle or a regular polygon.

The contour shape of the inner periphery of the cross section of the tube structure may also be a circle or a regular polygon.

The contour shape of the outer periphery of the cross section of the tube structure generally does not exceed the range of a circle with a radius of 20 mm.

The length of the tube structure generally does not exceed 20 mm.

When the contour shape of the outer periphery and the contour shape of the inner periphery of the cross section of the tube structure are circular, the diameter of the outer periphery is preferably 4 mm to 12 mm, and the diameter of the inner periphery is selected as 0.3 times to 0.7 times the diameter of the outer periphery.

The dielectric material with such a structure has the advantages of simple structure, accurate control of the dielectric constant, light weight per unit volume, easy and efficient production, and stable technical indicators. The use of such materials in the production of a Luneburg lens can significantly reduce the production cost and the weight of the Luneburg lens and play a very positive role in the use and the promotion of the Luneburg lens in a communication antenna.

It is to be noted that the important indicator of the dielectric material is dielectric constant. The foam material used by the tube wall of the tube structure should be a material in which the dielectric constant is as low as possible. The number, material and diameter of one metal wire segment may be configured to improve the dielectric constant. Moreover, the material and/or parameters may be artificially controlled. Therefore, the material and/or parameters are artificially configured to make the dielectric constant of the produced dielectric material finally satisfy the target.

The present disclosure further provides a dielectric material production method to produce a dielectric material with light weight per unit volume efficiently and low-costly. The solution described below is adopted.

The dielectric material production method includes the steps described below.

(1) Several metal wires are threaded into the extruder chamber of a rod extruder and then out of the extruder outlet of the rod extruder. When the rod extruder is extruding a tubular material, the metal wires are pulled synchronously such that the metal wires are evenly distributed in the tube wall without being in contact with each other so that a wired tube is obtained.

(2) Subsequently, the wired tube is cut into a required length to obtain the dielectric material.

The rod extruder is a foam material rod extruder.

Through such a solution, a dielectric material of a tube structure with metal wires inside can be easily and efficiently produced without longitudinally and latitudinally cutting. Since such a dielectric material is mainly a foamed structure, and the tube structure indicates that the dielectric material is hollow, the weight per unit volume of the dielectric material is very light. The number, material and diameters of the metal wires are selected to control the average dielectric constant of the final dielectric material.

In this production method, the material used by the rod extruder is preferably the EPE pearl cotton, the EPS material or the EVA material.

The contour shape of the outer periphery of the cross section of the wired tube may be a circle, a regular polygon or other shapes.

The contour shape of the inner periphery of the cross section of the wired tube may be a circle, a regular polygon or other shapes.

Additionally, before the wired tube is cut, it is best to give time to fully expand and cool the wired tube to stabilize the shape of the wired tube.

When the wired tube is cut, the length of each segment of the wired tube generally does not exceed 20 mm.

In the present disclosure, the dielectric material production method has the advantages of high production efficiency, low cost, light weight, and easy control of dielectric characteristics. The produced dielectric material can be used in the manufacturing of a Luneburg lens.

REFERENCE LIST 1 dielectric material
11 metal wire segment
2 dielectric material
21 metal wire segment
3 dielectric material
31 metal wire segment
4 dielectric material
41 metal wire segment

DETAILED DESCRIPTION

The content of the present disclosure is further described hereinafter in conjunction with embodiments.

Embodiment One

This embodiment is an illustrative example of a dielectric material structure of the present disclosure.

Figure 1:
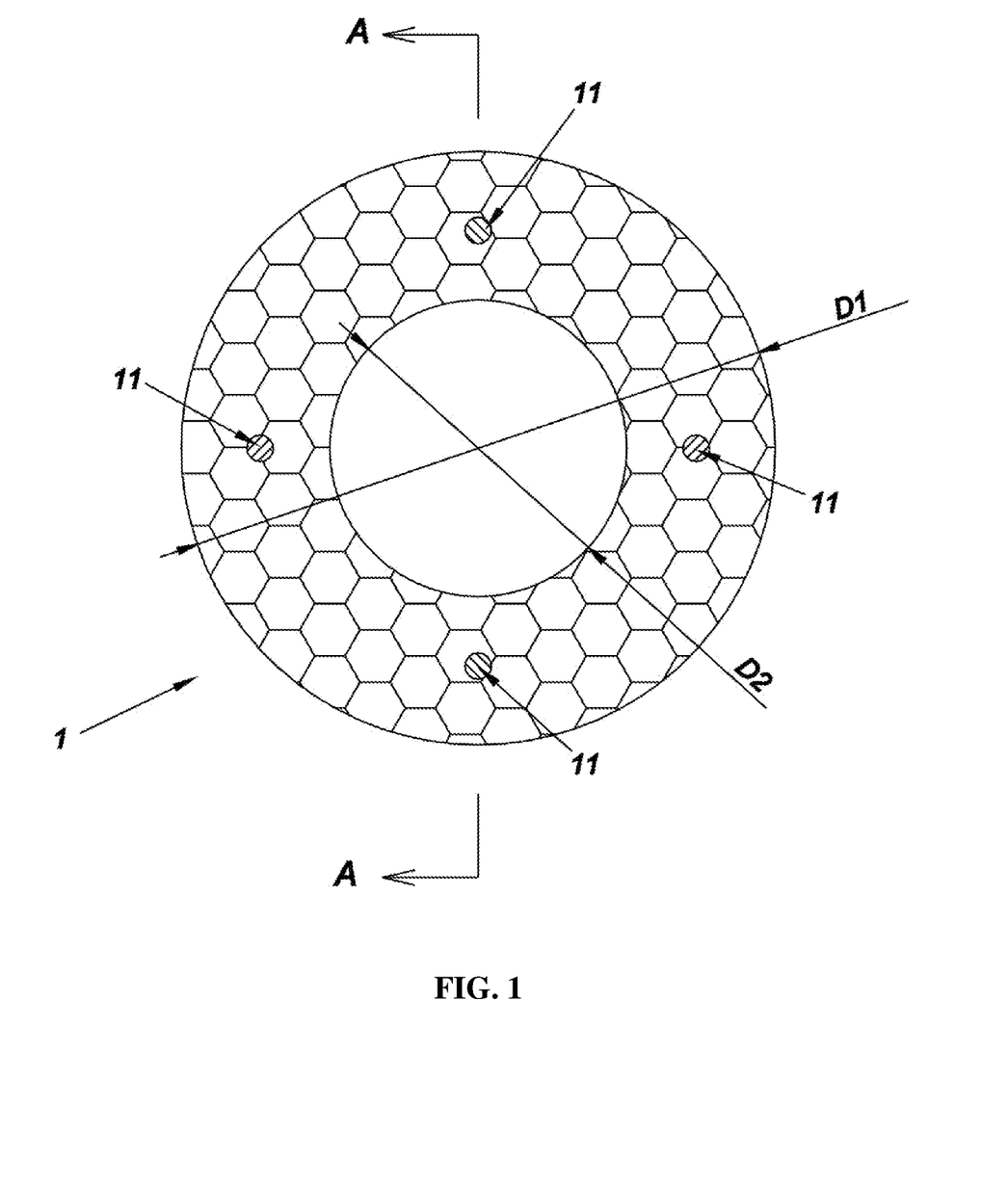
FIG. 1 is a front view illustrating the structure of a dielectric material according to embodiment one.
Figure 2:
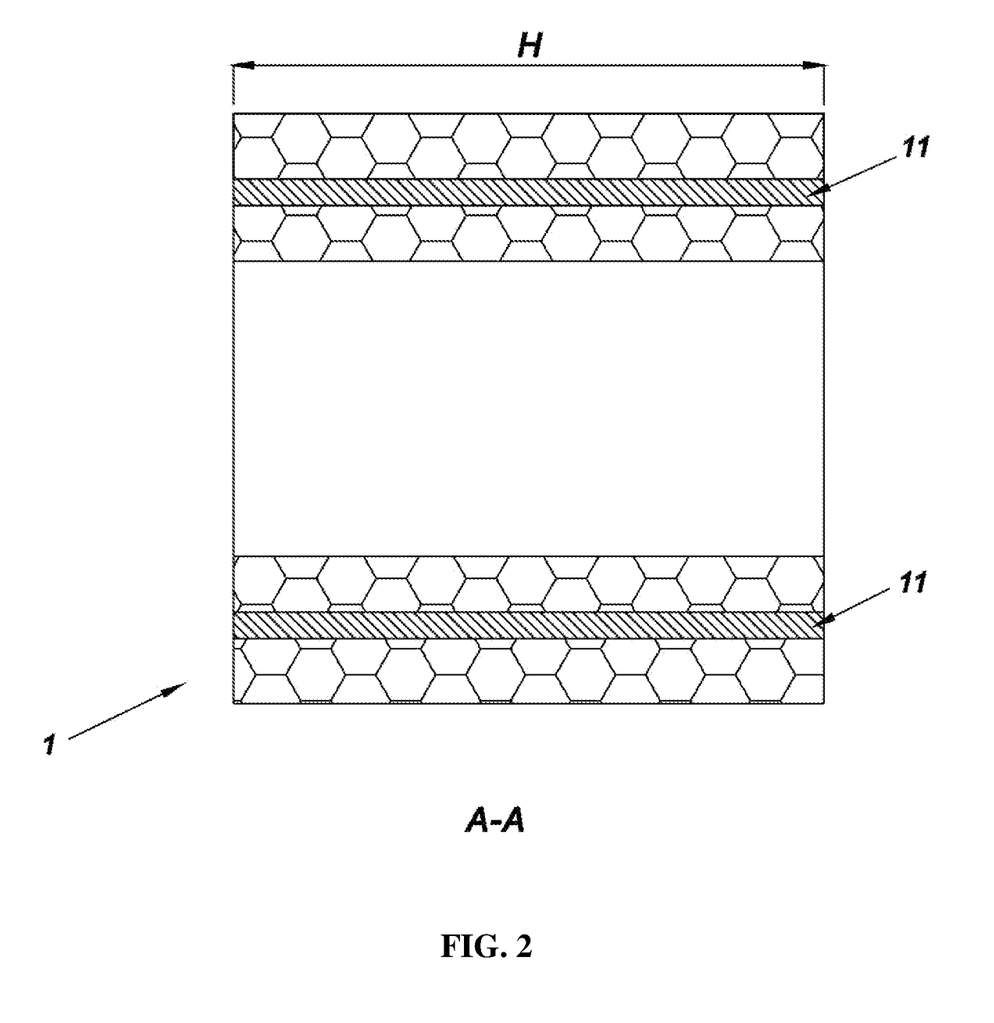
FIG. 2 is a section view taken along direction A-A of FIG. 1.

As shown in FIGS. 1 and 2, in this embodiment, a dielectric material 1 is a tube structure. The tube wall of the tube structure is formed from a foam material foamed. The dielectric material 1 further includes 4 metal wires 11. The metal wires 11 are disposed in the longitudinal direction of the tube structure, are evenly distributed in the tube wall of the tube structure without being in contact with each other.

In this embodiment, the contour of the outer periphery of the cross section of the tube structure of the dielectric material 1 is a circle. The diameter D1 of the outer periphery is 6 mm. The contour of the inner periphery of the cross section of the tube structure of the dielectric material 1 is also a circle. The diameter D2 of the inner periphery is 0.5 times the diameter D1. That is, the diameter D2 is 3 mm. The height H of the tube structure is 6 mm. The diameter of one metal wire segment 11 is 0.2 mm. The length of the metal wires 11 is the same as the height H of the tube structure.

In this embodiment, the tube wall of the tube structure is EPE pearl cotton, that is, polyethylene foaming cotton.

The dielectric material with such a structure has the advantages of easy mass production and light weight per unit volume.

Embodiment Two

This embodiment is another illustrative example of a dielectric material structure of the present disclosure.

Figure 3:
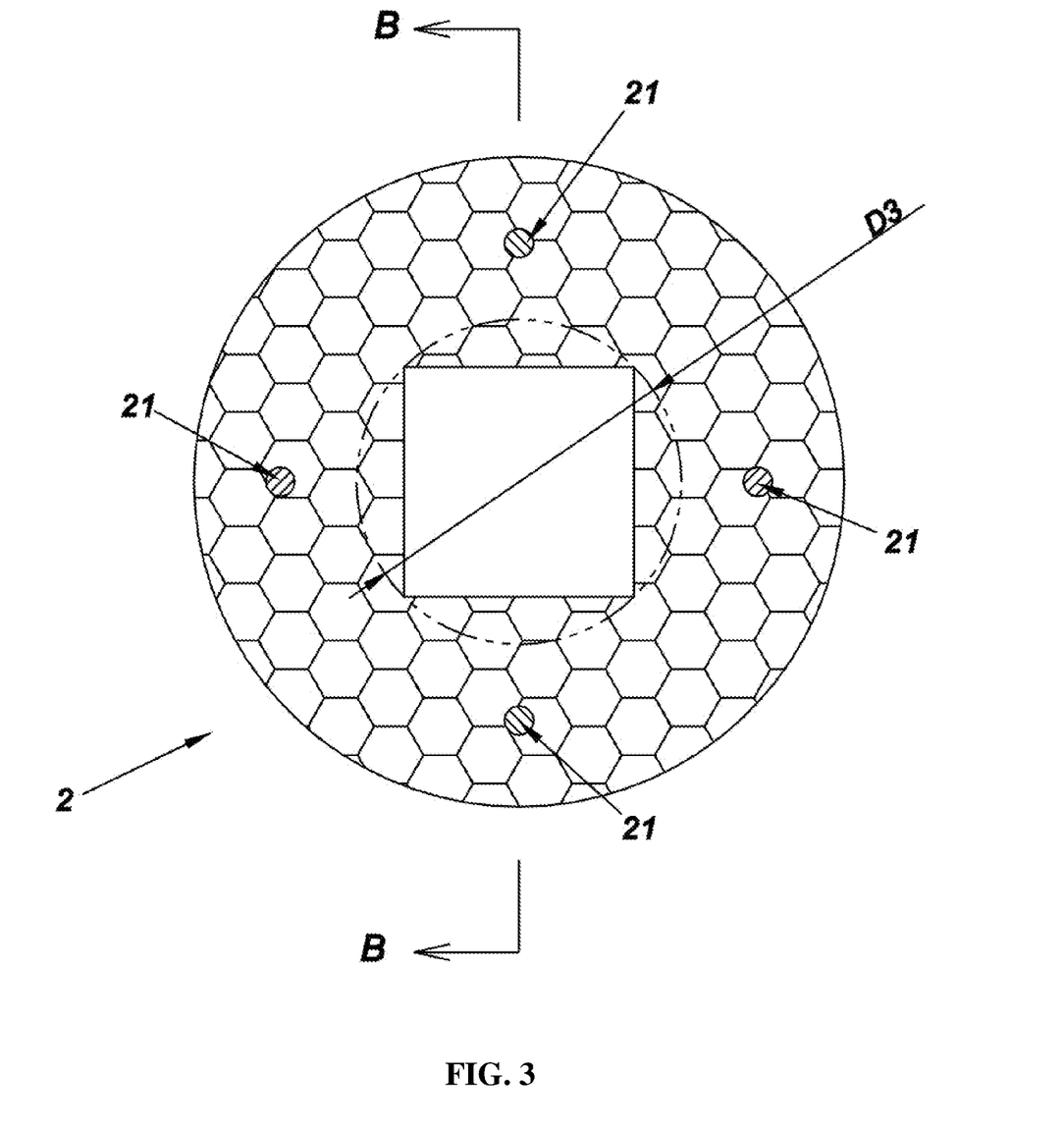
FIG. 3 is a front view illustrating the structure of a dielectric material according to embodiment two.
Figure 4:
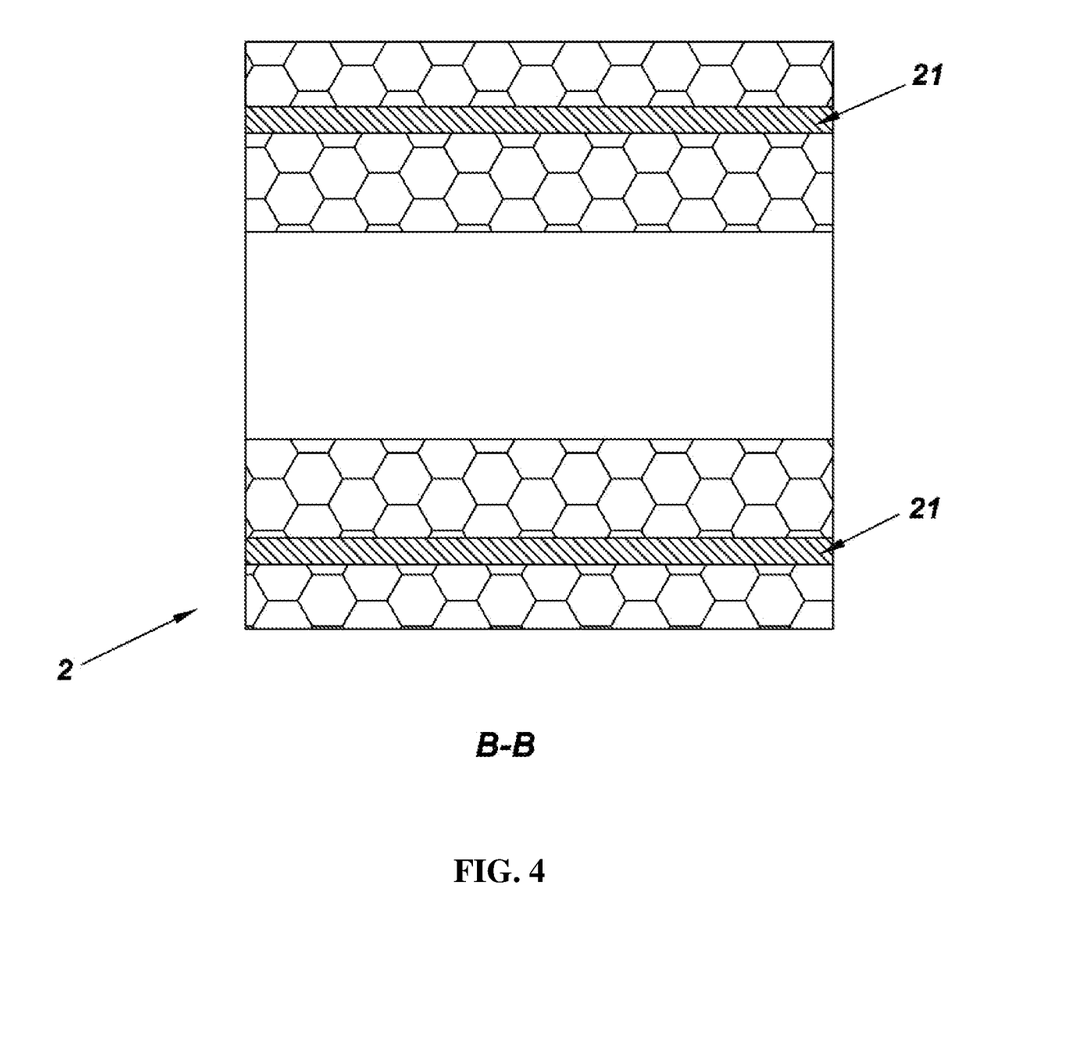
FIG. 4 is a section view taken along direction B-B of FIG. 3.

As shown in FIGS. 3 and 4, this embodiment is different from embodiment one in that: the contour of the inner periphery of the cross section of a tube structure is a square, and the diameter D3 of the circumscribed circle of the square is 3 mm.

Embodiment Three

This embodiment is another illustrative example of a dielectric material structure of the present disclosure.

Figure 5:
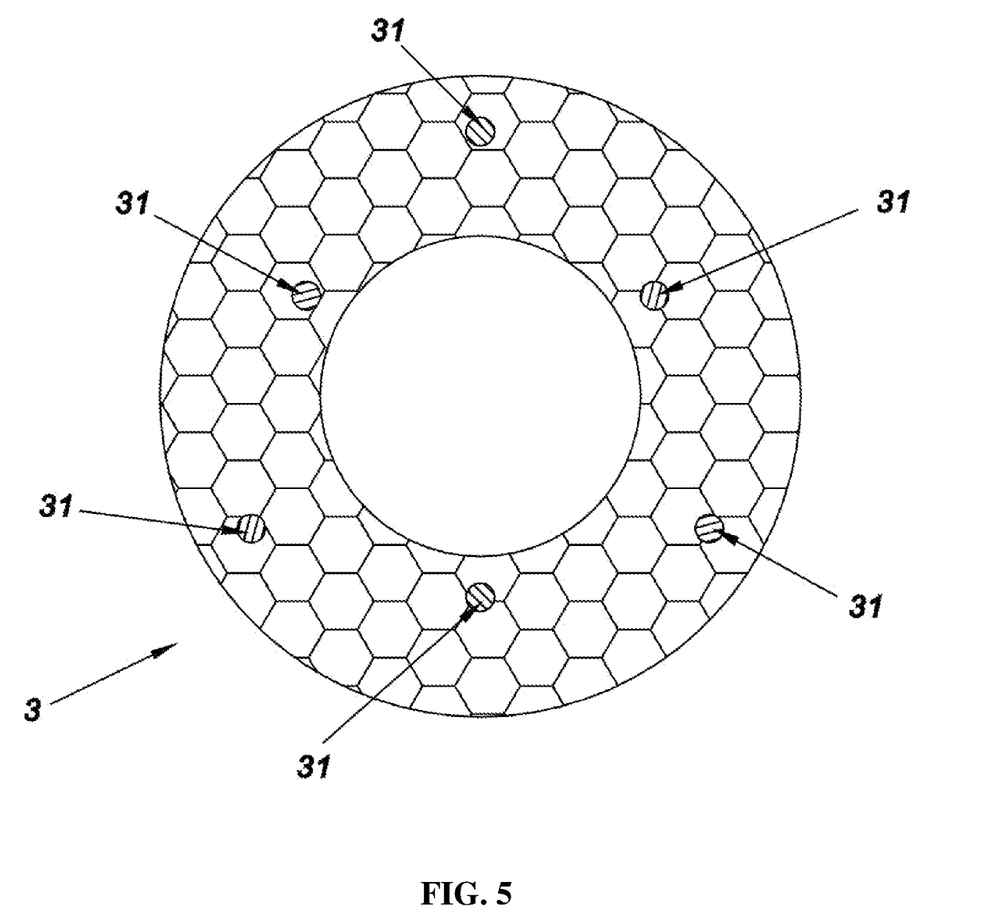
FIG. 5 is a front view illustrating the structure of a dielectric material according to embodiment three.

As shown in FIG. 5, this embodiment is different from embodiment one in that: the number of metal wires 31 is 6, and the metal wires 31 are evenly distributed in the tube wall of a tube structure in another arrangement.

Embodiment Four

This embodiment is another illustrative example of a dielectric material structure of the present disclosure.

Figure 6:
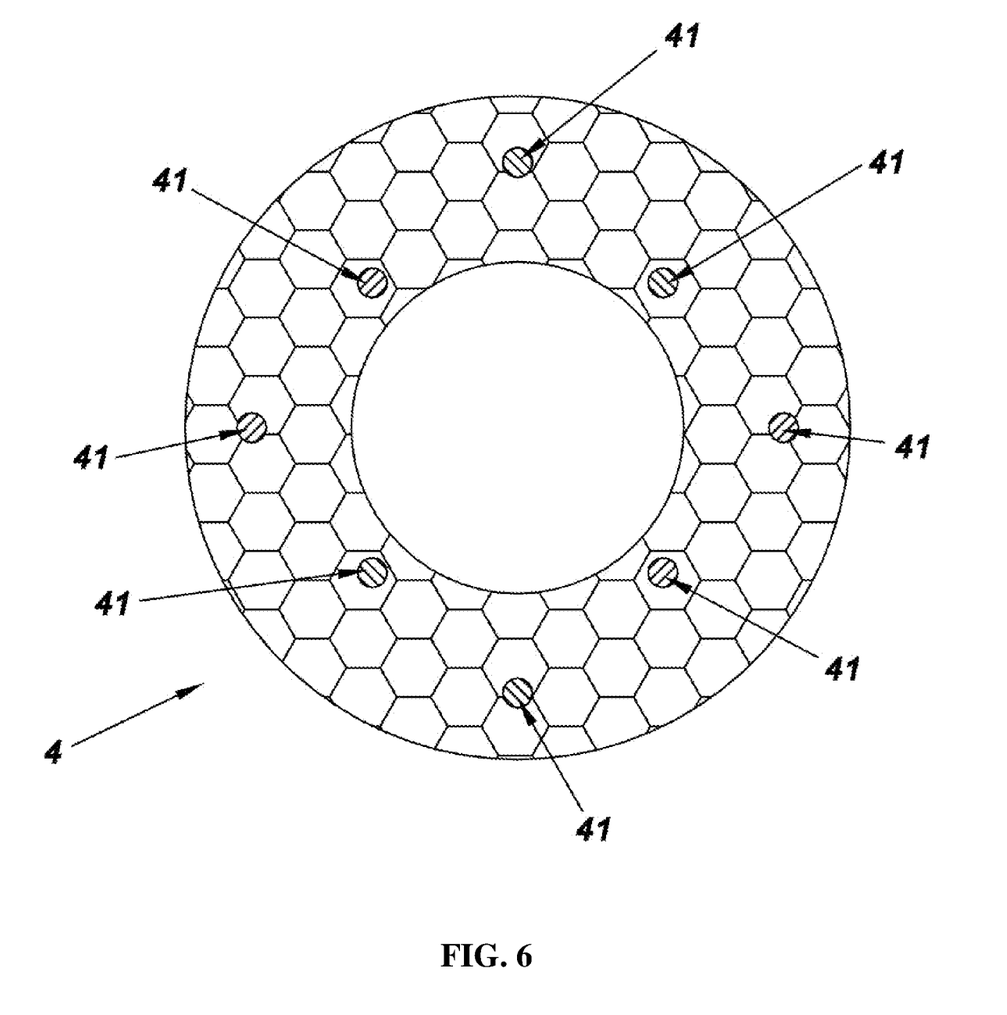
FIG. 6 is a front view illustrating the structure of a dielectric material according to embodiment four.

As shown in FIG. 6, this embodiment is different from embodiment one in that: the number of metal wires 41 is 8, and the metal wires 41 are evenly distributed in the tube wall of a tube structure in another arrangement.

Embodiment 5

This embodiment is an illustrative example of a dielectric material production method of the present disclosure.

(1) 4 metal wires are threaded into the extruder chamber of a rod extruder and then out of the extruder outlet of the rod extruder. The 4 metal wires are each coiled into a wire coil and are uncoiled during production. The rod extruder is a foam material rod extruder. In this embodiment, the material used is an EPE pearl cotton raw material. When the material extruded by the rod extruder forms a tube structure, the metal wires are pulled synchronously. The shape of the extruder outlet is designed accordingly such that the metal wires are evenly distributed in a tube wall without being in contact with each other so that a wired tube is obtained. In this embodiment, the diameter of the wired tube is 6 mm.

(2) Subsequently, the wired tube is cut into a tube structure with a height of 6 mm by a fixed-length cutter so that the dielectric material of the structure described in embodiment one is produced.

It is to be noted that the wired tube obtained in step (1) may be cut into the same length in a fixed-length manner and then step (2) is started, or the wired tube may be coiled integrally into a wire coil and then step (2) is started.

The embodiments set forth above are preferred embodiments of the present disclosure. Any equivalent technical variations made under the working principles and ideas of the present disclosure are within the scope of the present disclosure.

What is claimed is:

1. A dielectric material, the dielectric material being a tube structure, and a tube wall of the tube structure being formed by foaming a foam material; and the dielectric material further comprising metal wires, and the metal wires being disposed in a longitudinal direction of the tube structure, being evenly distributed in the tube wall of the tube structure without being in contact with each other,
    wherein a contour shape of an outer periphery of a cross section of the tube structure is a circle, a contour shape of an inner periphery of a cross section of the tube structure is a circle, the diameter of the outer periphery is 4 mm to 12 mm, and the diameter of the inner periphery is 0.3 times to 0.7 times the diameter of the outer periphery, and a length of the tube structure does not exceed 20 mm.

2. The dielectric material according to claim 1, wherein the foam material is expandable polyethylene (EPE) pearl cotton, an expandable polystyrene (EPS) material or an ethylene vinyl acetate (EVA) material.

3. The dielectric material according to claim 1, wherein a number of the metal wires is 2 to 8.

4. The dielectric material according to claim 1, wherein a diameter of each metal wire is in a range from 0.01 mm to 0.5 mm.

5. A production method for the dielectric material according to claim 1, comprising: (1) threading metal wires into an extruder chamber of a rod extruder and threading the metal wires out of an extruder outlet of the rod extruder; and while the rod extruder is extruding a material which is tubular, pulling the metal wires synchronously to enable the metal wires to be evenly distributed in a tube wall without being in contact with each other and so that a wired tube is obtained; and (2) cutting the wired tube to have a required length to obtain the dielectric material, wherein the rod extruder is a foam material rod extruder.

6. The production method according to claim 5, wherein the material extruded by the rod extruder is expandable polyethylene (EPE) pearl cotton, an expandable polystyrene (EPS) material or an ethylene vinyl acetate (EVA) material.

* * * * *